(12) United States Patent
Herntier

(10) Patent No.: US 8,366,185 B2
(45) Date of Patent: Feb. 5, 2013

(54) REINFORCING ELEMENT FOR A VEHICLE STRUCTURE, IN PARTICULAR FOR A SILL OF A MOTOR VEHICLE

(75) Inventor: Matthias Herntier, Friolzheim (DE)

(73) Assignee: Dr. Ing. H.C. F. Porsche Aktiengesellschaft (DE)

( * ) Notice: Subject to any disclaimer, the term of this patent is extended or adjusted under 35 U.S.C. 154(b) by 0 days.

(21) Appl. No.: 13/537,831

(22) Filed: Jun. 29, 2012

(65) Prior Publication Data

US 2013/0009424 A1 Jan. 10, 2013

(30) Foreign Application Priority Data

Jul. 7, 2011 (DE) .......................... 10 2011 051 622

(51) Int. Cl.
*B60J 7/00* (2006.01)
(52) U.S. Cl. .................. 296/209; 296/187.12
(58) Field of Classification Search .............. 296/209, 296/187.12, 203.03, 187.08, 193.05
See application file for complete search history.

(56) References Cited

U.S. PATENT DOCUMENTS

| | | | | |
|---|---|---|---|---|
| 5,641,194 | A * | 6/1997 | Honma et al. ........... | 296/203.03 |
| 6,409,257 | B1 * | 6/2002 | Takashina et al. ....... | 296/209 |
| 6,709,047 | B2 * | 3/2004 | Burge ..................... | 296/209 |
| 6,854,795 | B2 * | 2/2005 | Yamazaki et al. ........ | 296/209 |
| 6,951,366 | B2 * | 10/2005 | Tomita .................... | 296/187.08 |
| 7,118,170 | B2 * | 10/2006 | Montanvert et al. ..... | 296/209 |
| 7,300,099 | B2 * | 11/2007 | Godfrey et al. .......... | 296/187.12 |
| 7,874,611 | B2 | 1/2011 | Wani et al. | |

FOREIGN PATENT DOCUMENTS

| | | |
|---|---|---|
| DE | 195 28 874 | 2/1997 |
| DE | 100 03 878 | 8/2001 |
| DE | 100 30 370 | 1/2002 |
| DE | 102 04 971 | 8/2003 |
| DE | 43 07 836 | 9/2005 |
| DE | 100 37 593 | 9/2005 |
| DE | 10 2009 015 655 | 10/2009 |

\* cited by examiner

*Primary Examiner* — Joseph Pape
(74) *Attorney, Agent, or Firm* — Gerald E. Hespos; Michael J. Porco

(57) ABSTRACT

A reinforcing element has a dual-chamber profile produced by a rolling method to define an outer profile part supported with respect to an inner profile part. The two profile parts have a common wall as a straight web to which legs, offset in the same vertical plane, of the outer and inner profile parts adjoin. Reinforcing tubes are provided transversely with respect to the profile parts of the reinforcing element and are connected firmly to the profile parts. The reinforcing tubes preferably are directed toward seat crossmembers of the vehicle floor to improve side crash behavior.

12 Claims, 2 Drawing Sheets

REINFORCING ELEMENT FOR A VEHICLE STRUCTURE, IN PARTICULAR FOR A SILL OF A MOTOR VEHICLE

CROSS REFERENCE TO RELATED APPLICATION

This application claims priority under 35 USC 119 to German Patent Appl. No. 10 2011 051 622.0 filed on Jul. 7, 2011, the entire disclosure of which is incorporated herein by reference.

BACKGROUND OF THE INVENTION

1. Field of the Invention

The invention relates to a reinforcing element for a vehicle structure, in particular for a sill of a motor vehicle.

2. Description of the Related Art

DE 10 204 033 971 A1 discloses a reinforcing element in a sill of a motor vehicle. The reinforcing element is composed of two profile parts formed by the roll-forming of metal sheets. The profile parts are arranged one above the other and are connected to one another and to sill profiles by offset webs that are arranged in different vertical planes.

DE 100 03 878 B4 discloses a reinforcing element for a sill of a motor vehicle. The reinforcing element has an inner profile part and two outer profile parts arranged one above the other to form cavities. The inner profile part is of H-shape and the legs of the inner profile part form hollow bodies.

The object of the invention is to provide a reinforcing element for a sill of a motor vehicle so that the reinforcing element increases dimensional rigidity of the sill, improves crash behavior, has a low weight and can be manufactured in a simple way.

SUMMARY OF THE INVENTION

The invention relates to a reinforcing element for a sill of a motor vehicle. The reinforcing element has an optimized crash behavior in the transverse direction of the vehicle and gives rise to a reinforcement of the sill in the longitudinal and transverse directions of the vehicle. The reinforcing element is encapsulated between two sill profiles and has an S-shaped dual-chamber profile arranged so that one chamber lies next to the other to define inner and outer profile parts. Each profile part has a straight web in a common vertical mid-plane. Legs of the profile parts adjoin the straight web and are connectable on the end faces to offset matching legs of the sill profiles. Reinforcing tubes are arranged in the transverse direction with respect to the profile parts and penetrate through hollow chambers of the profile parts in orifices aligned with one another. The reinforcing tubes are connected firmly to the profile parts.

The aligned orifices preferably are provided in downwardly oriented walls of the profile parts. The reinforcing tubes are arranged in the orifices, at least in the region of seat crossmembers of the vehicle floor, and extend from the outer wall of the outer profile part as far as the outer wall of the inner profile part.

The aligned orifices preferably are arranged at a distance from one another over the length of the profile parts and are oriented to run obliquely at an angle α to a horizontal plane. The free ends of the reinforcing tubes may terminate to protrude with respect to the walls of the profile parts.

The two profile parts and the cavities lie next to one another with the reinforcing tubes penetrating through the cavities. Thus, a hollow-chamber bearer is achieved between the sill profiles to provide optimum reinforcement of the sill and therefore the vehicle structure and to improve crash behavior in the event of a side crash.

The connection of the reinforcing tubes to the individual walls of the profile parts affords partial stabilization of the profile parts, and the directed arrangement of the reinforcing tubes in the region of the seat crossmembers introduces forces into the seat crossmembers in the event of a side crash. The oblique positioning of the reinforcing tubes in the profile parts conducts the forces caused by a side crash directly into the seat crossmembers.

The outer profile part preferably is displaced vertically up with respect to the inner profile part and is arranged to overlap with the inner profile part by means of upper and lower edge portions. These overlap regions make enable the profile parts to be supported with respect to one another.

The inner profile part preferably is substantially rectangular, and the outer profile preferably has an outer side wall running obliquely. This vertically displaced arrangement of the profile parts enables the profile parts to be supported with respect to one another at an upper and lower edges in such a way that the outer profile part is supported with an overlap portion on the upper edge of the inner profile part and the lower edge of the outer profile part is supported on an overlap portion of the inner profile part.

The oblique wall of the outer profile part enables the oblique run of the reinforcing tubes which are cut to at right angles at their outer free end to run approximately in one plane with the oblique face of the outer profile part. The opposite free end of the reinforcing tube preferably is cut obliquely and lies approximately in a same plane as the outer wall of the inner profile part.

Each of the two profile parts is a unitary sheet metal element roll-formed by a rolling method and connected to one another by a weld in overlap regions of the profile parts. The rolling method enables the sheet metal element to be provided with the orifices for the reinforcing tubes and precut can be formed into a dual-chamber profile and at the same time connected via welds, such as a laser weld or fillet welds.

An exemplary embodiment of the invention is illustrated in the drawings and is described in more detail below.

DETAILED DESCRIPTION OF THE PREFERRED EMBODIMENTS

Figure 1:
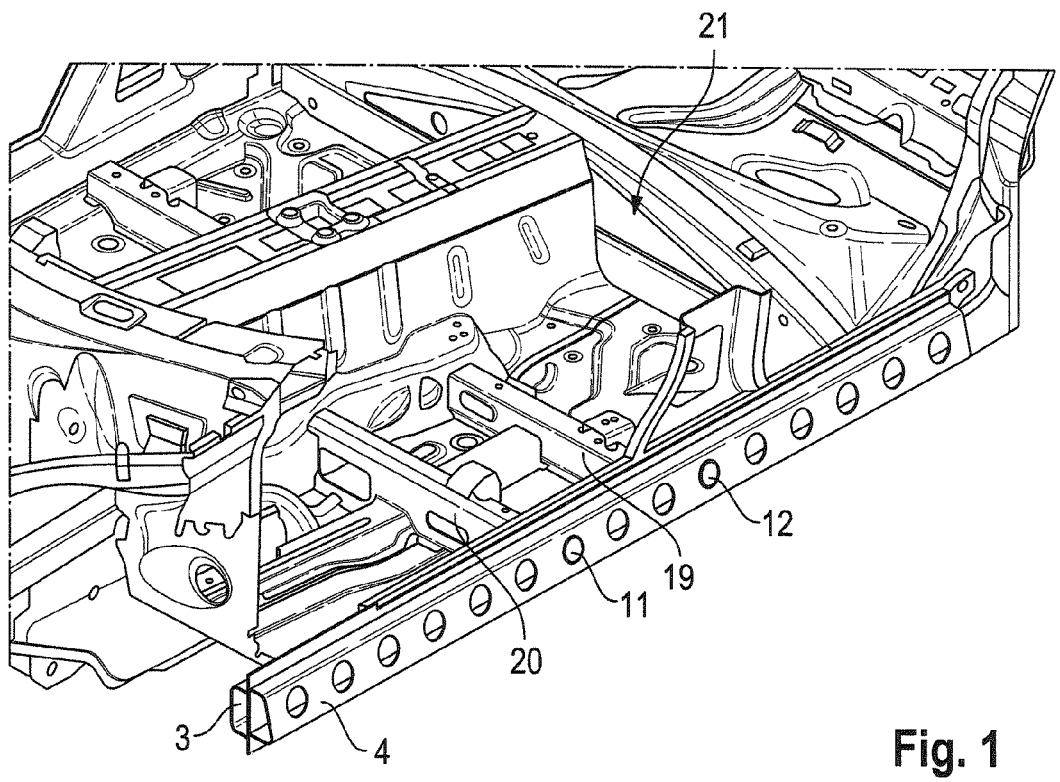
FIG. 1 is a perspective view of a vehicle structure from above with a sill reinforcement.
Figure 2:
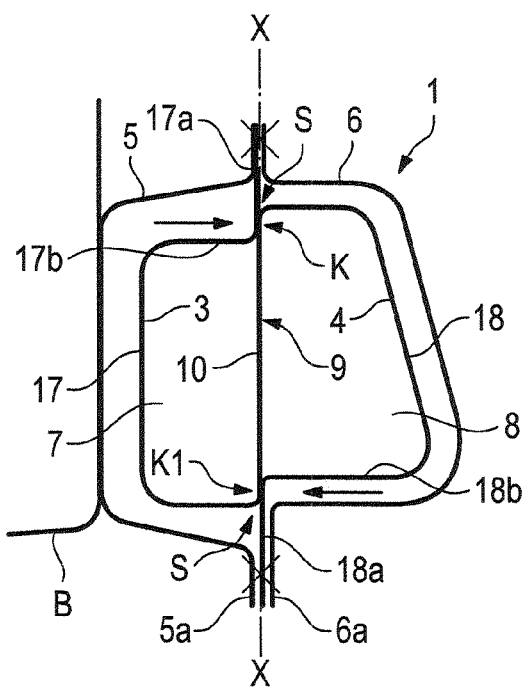
FIG. 2 is a cross section through the sill reinforcement and FIG. 3 is perspective view thereof.

A reinforcing element 1 for a sill 2 of a motor vehicle comprises two profile parts 3 and 4 that are held and encapsulated between sill profiles 5 and 6. The sill profile 5 is connected to a vehicle floor B.

The profile parts 3, 4 form a horizontally arranged S-shaped dual-chamber profile with an inner and an outer profile part 3, 4 arranged to lie next to one another and to form hollow chambers 7, 8.

A straight web 9 is provided between the profile parts 3, 4 and separates the chambers 7, 8 of the profile parts 3, 4 and is formed by a drawn-up wall 10 of the inner profile part 3.

Reinforcing tubes 11, 12 are inserted in a transverse direction with respect to the profile parts 3, 4 into aligned orifices 14, 15, 16 in walls 17, 10 and 18 of the profile parts 3, 4. The reinforcing tubes 11, 12 penetrate through the orifices 14, 15, 16 and are connected to the walls 17, 10 and 18 of the profile parts 3, 4.

The reinforcing tubes 11, 12 preferably are arranged opposite seat crossmembers 19, 20 of the vehicle floor B in the vehicle structure 21, so that forces can be introduced into the seat crossmembers 19, 20 in the event of a side crash.

The orifices 14, 15, 16 are spaced from one another in the walls 10, 17, 18 of the profile parts 3, 4 over the length of the profile parts 3, 4. The reinforcing tubes 11, 12 preferably are arranged only opposite the seat crossmembers 19, 20. However, further reinforcing tubes also may be arranged in the other orifices.

Figure 4:
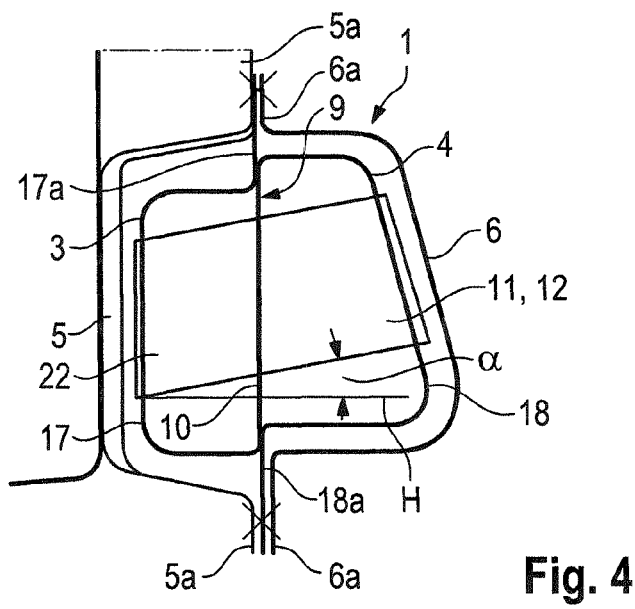
FIG. 4 is an enlarged illustration of a front part of the sill reinforcement with inserted reinforcing tubes.
Figure 5:
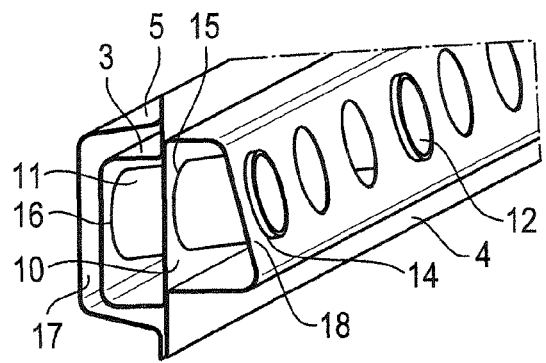
FIG. 5 is a perspective view of the sill reinforcement with inserted reinforcing tubes.

As illustrated in more detail in FIG. 4, the reinforcing tubes 11, 12 run at an angle α to a horizontal plane H and therefore are directed with an inner free tube end 22 toward the seat crossmembers 19, 20. The tube ends 22, 23 terminate to project with respect to the walls 17, 18 of the profile parts 3 and 4.

Figure 3:
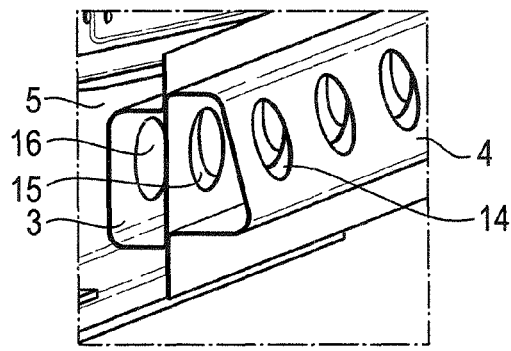

As can be seen in more detail in FIG. 3, the outer profile part 4 is displaced vertically with respect to the inner profile part 3. This vertical displacement between the two profile parts 3 and 4 creates upper and lower overlap regions K and K1 that enable the profile parts 3 and 4 to be supported with respect to one another.

The two profile parts 3 and 4 preferably are formed from a unitary sheet metal element subjected to roll-forming and are connected to one another by welds S in the overlap regions K and K1. Legs 17*a* and 18*a* are offset from a wall 17*b* and 18*b* of the profile parts 3, 4 and are connected to offset legs 5*a* and 6*a* of the sill profiles 5 and 6. The legs 17*a* and 18*a* are arranged substantially in a common vertical mid-plane x-x with the wall 10 or with the web 9 formed by the roll-forming process.

The S-shaped run of the reinforcing element 1 or of the profile parts 3 and 4 arises due to the run of the wall 17, the wall 10 and the wall 18. This design creates the common web 9 for the two profile elements 3, 4, which forms the wall 10 between the profile parts 3, 4.

The legs 17*a* and 18*a* also may be arranged to be displaced with respect to one another in the vehicle transverse direction, in which case the web 9 would be oblique to the vertical direction.

The inner profile part 3 preferably is substantially rectangular and is oriented on edge in the installed state. The outer profile part 4 preferably is trapezoidal with an oblique frontside wall 18. This obliquely wall 18 preferably predetermines the oblique position of the reinforcing tubes 11, 12 at the angle α. The two profile parts 3, 4 may have many forms and do not necessarily have to be rectangular.

What is claimed is:

1. A reinforcing element encapsulated between two sill profiles of a sill of a motor vehicle, the reinforcing element comprising: inner and outer profile parts displaced vertically with respect to one another, the profile parts having a straight web in a substantially vertical mid-plane, offset inner and outer legs adjoining opposite respective inner and outer surfaces of the straight web and being connected respectively to legs of the sill profiles, and reinforcing tubes running in a transverse direction of the profile parts, the reinforcing tubes penetrating through aligned orifices in the profile parts and passing through hollow chambers defined by the profile parts, ends of the reinforcing tubes being connected firmly to the profile parts.

2. The reinforcing element of claim 1, wherein the aligned orifices for the reinforcing tubes are arranged in a wall of the straight web and in outer walls of the profile parts at least in regions of seat crossmembers of a floor structure, the reinforcing tubes extending from the outer wall of the outer profile part to the outer wall of the inner profile part.

3. The reinforcing element of claim 2, wherein the aligned orifices are spaced from one another along a length of the profile parts and are oriented obliquely at an angle to a horizontal plane, free tube ends of the reinforcing tubes protruding from the outer walls of the profile parts.

4. The reinforcing element of claim 2, wherein the outer profile part is displaced vertically up from the inner profile part and overlaps the inner profile part at upper and lower support portions that support the profile parts with respect to one another.

5. The reinforcing element of claim 2, wherein the inner profile part is substantially rectangular and the outer profile part is substantially trapezoidal with the outer wall running obliquely down.

6. The reinforcing element of claim 1, wherein the two profile parts are formed from a unitary sheet metal element.

7. The reinforcing element of claim 1, wherein the web is unitary with the inner profile part and the outer profile part.

8. A reinforcing element encapsulated between two sill profiles of a sill of a motor vehicle, the reinforcing element comprising:
   a middle wall having opposite inner and outer surfaces and opposite top and bottom ends;
   an inner profile part bent unitarily from the bottom end of middle wall to define a hollow chamber adjacent the inner surface of the middle wall;
   an upper leg bent from an upper end of the inner profile part and engaged with the inner surface of the middle wall substantially adjacent the top end of the middle wall;
   an outer profile part bent unitarily from the top end of middle wall to define a hollow chamber adjacent the outer surface of the middle wall;
   a lower leg bent from a lower end of the outer profile and engaged with the outer surface of the middle wall substantially adjacent the bottom end of the middle wall; and
   reinforcing tubes running in a transverse direction of the profile parts, the reinforcing tubes penetrating through aligned orifices in the profile parts and passing through the hollow chambers, ends of the reinforcing tubes being connected firmly to wall of the profile parts opposite the middle wall.

9. The reinforcing element of claim 8, wherein the upper and lower legs are secured between flanges of the sill profiles.

10. The reinforcing element of claim 8, wherein the upper and lower legs and the middle wall lie substantially in a common plane.

11. The reinforcing element of claim 8, wherein the inner profile part is substantially rectangular and the outer profile part is substantially trapezoidal.

12. A motor vehicle comprising:
   at least one sill extending substantially in a longitudinal direction of the motor vehicle at a lateral side of the motor vehicle, said sill being formed from two sill profiles;
   seat crossmembers extending transversely from the sill toward a center of the vehicle; and
   a reinforcing element encapsulated between the sill profiles, the reinforcing element including:
   inner and outer profile parts displaced vertically with respect to one another, the profile parts having a straight web in a substantially vertical mid-plane, offset inner and outer legs adjoining opposite respective inner and outer surfaces of the straight web and being connected respectively to legs of the sill profiles, and reinforcing tubes running in a transverse direction of the profile parts at least at positions substantially aligned with the seat crossmembers, the reinforcing tubes penetrating through aligned orifices in the profile parts and passing through hollow chambers defined by the profile parts, ends of the reinforcing tubes being connected firmly to the profile parts.

* * * * *